United States Patent Office 3,317,796
Patented May 2, 1967

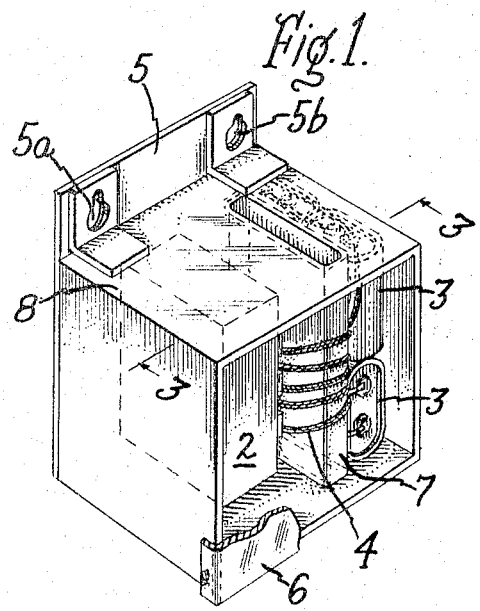
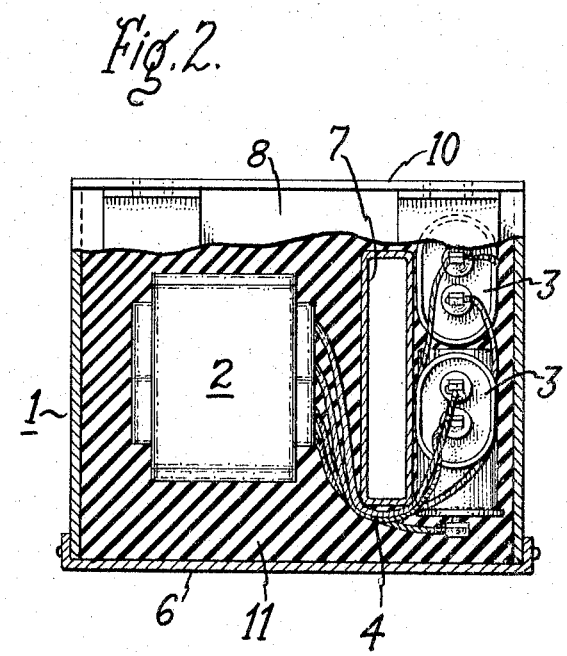
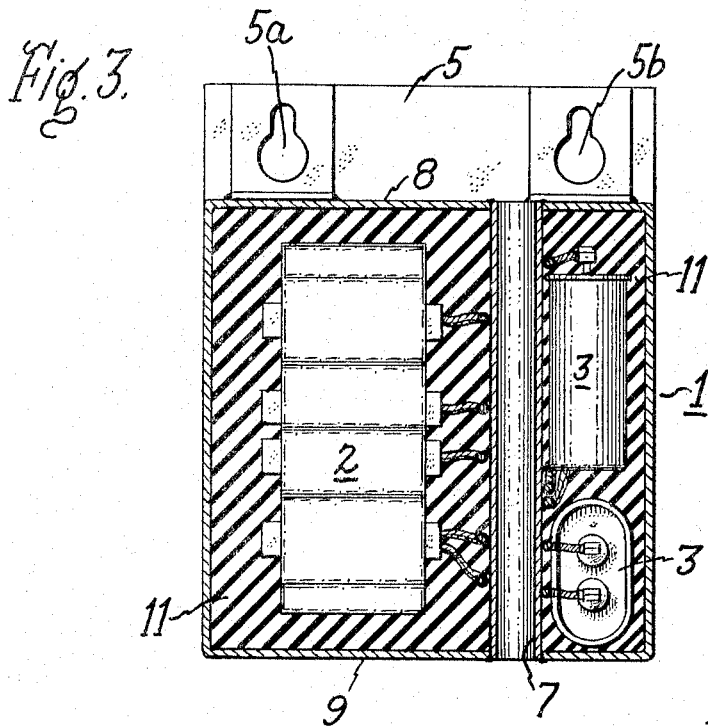

3,317,796
COOLING ARRANGEMENT FOR ELECTRICAL APPARATUS
Richard L. Thompson, Hendersonville, N.C., assignor to General Electric Company, a corporation of New York
Filed Oct. 27, 1964, Ser. No. 406,828
4 Claims. (Cl. 317—100)

The present invention relates to a cooling arrangement for electrical apparatus which generates heat during operation, and more particularly to such arrangement for ballast apparatus employed with lighting equipment.

Lighting equipment such as street lights, luminaires, floodlights and other lights conventionally employ fluorescent, mercury vapor or other types of gas discharge lamps which require electrical ballast circuits for their operation. Such ballast circuits normally include the combination of a capacitor and transformer, which because of the need to interconnect one with the other are usually located in close proximity to each other. In a usual arrangement, the capacitors and transformers in a ballast unit are placed in a metal container and are immobilized therein by potting material, such as an asphalt compound, which is introduced in molten form into the container and allowed to solidify. With the advent of lighting equipment of increased ratings, i.e., over 400 watts, it was found that the excessive heat generated by the ballast transformer in such units tended to adversely affect the life and operation of the capacitors therein. Various suggestions were made to overcome this problem but they were not generally found feasible. For example, placing the capacitors on the outside of the luminaire housing which contained the transformer led to difficulties in wiring the capacitors to the transformer. In other situations where both ballast components were placed in a container for mounting in a location remote from the lighting unit, such as in the pole base or the wall of an adjacent building, it was attempted to avoid the excessive heating problem by increasing the size of the container to thereby increase its surface area for improved heat dissipation. However, this expedient made the ballast unit too large and expensive and prevented its use in the pole base and other convenient locations where size and weight of the unit are factors.

It is an object of the invention to provide an improved electrical ballast unit adapted for use with high rated lighting and other electrical equipment which employ ballast components.

It is another object of the invention to provide an improved electrical ballast unit having reduced heat during operation.

It is still another object of the invention to provide compact ballast units of reduced size and weight for use with lighting and other electrical equipment of high ratings.

It is still a further object of the invention to provide ballast units of the above-described type which are readily and economically manufactured and assembled, and are adapted for placement in various locations relative to the lighting equipment with which they are associated.

Other objects and advantages will become apparent from the following description and the appended claims.

With the above objects in view the present invention relates in a broad aspect to electrical apparatus comprising a container, first and second interconnected electrical components located in the container, one of the electrical components generating substantial heat during operation thereof, and tubular means in the container separating the electrical components therein, the tubular means being arranged vertically with its opposite ends open to the exterior of the container, whereby the tubular means is cooled by air passing by convection therethrough for cooling the interior of the container.

The invention will be better understood from the following description taken in conjunction with the accompanying drawing, in which:

FIGURE 1 is a perspective view of an electrical ballast unit embodying the invention;

FIGURE 2 is a top view of the FIGURE 1 device with the upper wall partly broken away; and FIGURE 3 is a side sectional view of the device of FIGURES 1 and 2 taken along the line 3—3 of FIGURE 1.

Referring now to the drawings, there is shown in FIGURE 1 an electrical ballast unit adapted to be connected in circuit with lighting equipment such as a mercury vapor floodlight, the unit comprising a metal container 1 preferably made of aluminum containing therein a ballast transformer 2 and one or more ballast capacitors 3 suitably interconnected by leads 4, the transformer and capacitors being laterally spaced and connected by suitable means in circuit with the lighting equipment, not shown. In the embodiment shown, container 1 has a projecting flange 5 formed with cut-out portions 5a, 5b for hanging the unit on a vertical wall or other support. The open side of container 1 is closed by a flanged cover 6 shown in fragmentary form.

In accordance with the invention, a tubular partition 7 is arranged vertically in the interior of the container between transformer 2 and capacitors 3 with the opposite ends of partition 7, also preferably made of aluminum, opening on the outside of the top and bottom walls 8 and 9 of the container and joined thereto in fluid-tight relation by welding or other suitable means.

As seen more clearly in FIGURE 2, partition 7 is of rectangular cross-section and is spaced inwardly of cover 6 and back wall 10, for enabling passage of lead wires 4 and for other reasons hereinafter explained. With transformer 2 and capacitors 3 placed in container 1 on opposite sides of tubular partition 7 and interconnected, the container is filled with potting compound 11 while the container rests with its open side facing upwardly. By virtue of the spacing left between the partition 7 and the front and back walls of the container, the liquid potting material flows readily into both compartments of the container in which the transformer 2 and capacitors 3 are disposed. The potting material 11 is then allowed to solidify, thereby firmly holding the electrical components in place. Thereafter, cover 6 is placed over the open side and secured to the container by suitable fastening means, such as screws. Potting material 11 serves not only to embed the electrical components for holding them in place but also to assist in heat transfer from the embedded components to partition 7. Any suitable potting material such as an asphalt material may be used.

It will be evident from the construction of partition 7 as described and shown that it prevents the entry of rain and other atmospheric contaminants into the sealed interior of container 1, and also provides a continuous chamber in the container into which potting material may be introduced for filling the entire chamber as described above.

As shown in FIGURE 3, tubular partition 7 is vertical when the container is arranged in operative position, and it thereby effectively serves not only as a physical barrier between the transformer and capacitors to hinder transfer of heat to the latter from the transformer, but also, and more significantly, positively removes heat from the container interior by upward passage of air from the bottom to the top of the tubular member by thermal convection, thus drawing cooler air into the tube 7 from the bottom. The more the heat generated in the container, the hotter becomes the air passing through partition 7, and the faster is the upward movement of the air, thus providing a simple yet effective heat-dissipating mechanism.

By virtue of the cooling effect thus produced, the risk of damage to the capacitors in the ballast unit due to excessive heat is markedly reduced, and the invention thus makes it possible to employ less expensive capacitors without degradation of the life or operating characteristics of the capacitors. Moreover, the invention makes it possible to locate the transformer and capacitors relatively close to one another to provide a compact unit of sufficiently small bulk to be placed in pole bases or other locations of limited space, while avoiding the problem of excessive heat concentration.

The cooling arrangement of the invention also affords advantages in the process of manufacture of the ballast unit, in that the rapid dissipation of heat which results therefrom not only speeds the process of solidfying the molten potting material but also reduces the risk of damage to the embedded electrical components due to the high temperature of the molten material (e.g., 325° F.). Such temperatures approach the melting point of the solder conventionally used to seal the ballast capacitor, and thus entail a risk of opening the seal and causing leakage of dielectric liquid from the capacitor casing unless the temperature rise in the ballast container is limited.

In thermal tests made on ballast units housed in a container such as shown in the drawing except for the absence of a hollow partition member, it was found that the average temperature of the capacitors during operation of the ballast unit was about 100° C. and this temperature was about the same even with a solid fiber glass partition member. In comparative tests using identical ballast units except for the addition of a tubular partition as described above, the observed capacitor temperatures averaged about 75° C., showing a 25° C. reduction in temperature achieved by employing the present invention. Thermocouples applied to the transformer windings in these comparative tests indicated that a reduction in temperature rise from 120° C. to 70.9° C. was achieved in the primary windings, and from 127.7° C. to 78.6 C. in the secondary windings, by employing the partition member of the invention.

While particularly satisfactory results were obtained by the use of a single tubular partition of rectangular cross-section as disclosed, the partition may if desired have other cross-sectional shapes, such as circular, oval, or other configuration, and instead of a single partition member, a plurality of separate or interconnected tubular partition members may be used to intercept and dissipate the heat generated by the ballast transformer.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desired to secure by Letters Patent of the United States is:

1. Electrical ballast apparatus comprising, in combination, a metallic container, heat transmitting potting material in said container, transformer and capacitor devices embedded laterally spaced from each other in said potting material in said container, said transformer device generating substantial heat during operation thereof, and a rectangular metallic tube member in said container separating said transformer and capacitor devices therein and spaced from all the side walls of said container, said rectangular metallic tube member having a vertically extending passage and being open at its opposite ends to the exterior of said container and being fluid tightly sealed at said opposite ends to the top and bottom walls of said container, whereby said rectangular metallic tube member is cooled by air passing upwardly by convection therethrough for cooling the interior of said container.

2. Electrical ballast apparatus comprising, in combination, a metallic container, heat transmitting potting material in said container, transformer and capacitor devices embedded laterally spaced from each other in said potting material in said container, said transformer device generating substantial heat during operation thereof, and a metallic tube member in said container separating said transformer and capacitor devices therein and spaced from all the side walls of said container, said metallic tube member having a vertically extending passage and being open at its opposite ends to the exterior of said container and being sealed at said opposite ends to the top and bottom walls of said container, whereby said metallic tube member is cooled by air passing upwardly by convection therethrough for cooling the interior of said container, and whereby rain and other atmospheric contaminants are prevented from entry into the thus sealed interior of the container.

3. Electrical ballast apparatus comprising, in combination, a metallic container, heat transmitting potting material in said container, transformer and capacitor devices embedded laterally spaced from each other in said potting material in said container, said transformer device generating substantial heat during operation thereof, and a metallic tube member in said container separating said transformer and capacitor devices therein and spaced from all the side walls of said container, said metallic tube member having a vertically extending passage and being open at its opposite ends to the exterior of said container and being sealed at said opposite ends to the top and bottom walls of said container, whereby said metallic tube member is cooled by air passing upwardly by convection therethrough for cooling the interior of said container, and whereby rain and other atmospheric contaminants are prevented from entry into the thus sealed interior of the container, said metallic tube member being so dimensioned and arranged as to lie interposed between said transformer and capacitor devices along substantially the entire widths thereof for substantially preventing direct transmission of heat between said separated transformer and capacitor devices.

4. Electrical apparatus comprising, in combination, a metallic container, first and second electrical devices laterally spaced from each other in said container, at least one of said devices generating substantial heat during operation thereof, and a metallic tube member having a vertically extending passage and being open at its opposite ends to the exterior of said container and being sealed at said opposite ends to the top and bottom walls of said container, whereby said metallic tube member is cooled by air passing upwardly by convection therethrough for cooling the interior of said container and whereby rain and other atmospheric contaminants are prevented from entry into the thus sealed interior of the container, said metallic tube member being spaced from all the side walls of said container so as to provide a continuous chamber therein into which potting material may be introduced for filling the entire chamber for embedding said electrical devices therein.

References Cited by the Examiner

UNITED STATES PATENTS

| | | | |
|---|---|---|---|
| 2,463,557 | 3/1949 | Pohm | 317—100 X |
| 2,668,947 | 2/1954 | Stewart | 336—96 |
| 2,815,472 | 12/1957 | Jackson | 317—100 X |
| 3,013,186 | 12/1961 | Jones | 317—100 |
| 3,022,448 | 2/1962 | Mason | 317—100 X |
| 3,181,034 | 4/1965 | Kell et al. | 317—100 |
| 3,197,545 | 7/1965 | Moore | 174—52 |

FOREIGN PATENTS 787,631   12/1957   Great Britain.

ROBERT K. SCHAEFER, *Primary Examiner.*

KATHLEEN H. CLAFFY, *Examiner.*

J. BOSCO, R. S. MACON, *Assistant Examiners.*